(12) United States Patent
Da Silva Baptista Russo et al.

(10) Patent No.: US 12,190,047 B2
(45) Date of Patent: Jan. 7, 2025

(54) METHODS, APPARATUSES AND SYSTEMS FOR MANAGING A MULTI-TENANT APPLICATION SYSTEM

(71) Applicant: Hitachi Vantara LLC, Santa Clara, CA (US)

(72) Inventors: Carlos Manuel Da Silva Baptista Russo, Lisbon (PT); Duarte Maria Elias Da Costa Da Cunha Leão, Alcabideche (PT); Guilherme Coelho Barreira Raimundo, Oeiras (PT); Marco Paulo De Sousa Correia Vala, Oeiras (PT); Nelson Diogo Almeida Antunes, Amadora (PT)

(73) Assignee: HITACHI VANTARA LLC, Santa Clara, CA (US)

( * ) Notice: Subject to any disclaimer, the term of this patent is extended or adjusted under 35 U.S.C. 154(b) by 0 days.

(21) Appl. No.: 17/792,738

(22) PCT Filed: Jan. 28, 2020

(86) PCT No.: PCT/US2020/015286
§ 371 (c)(1),
(2) Date: Jul. 14, 2022

(87) PCT Pub. No.: WO2021/154206
PCT Pub. Date: Aug. 5, 2021

(65) Prior Publication Data
US 2023/0059754 A1    Feb. 23, 2023

(51) Int. Cl.
*G06F 40/166* (2020.01)
*G06F 3/04847* (2022.01)
(Continued)

(52) U.S. Cl.
CPC ........ *G06F 40/166* (2020.01); *G06F 3/04847* (2013.01); *G06F 9/547* (2013.01); *G06F 16/93* (2019.01)

(58) Field of Classification Search
CPC .................................................... G06F 40/166
See application file for complete search history.

(56) References Cited

U.S. PATENT DOCUMENTS

2010/0077457 A1    3/2010   Xu et al.
2011/0292072 A1*  12/2011   Fisher et al. ............ G09G 5/00
(Continued)

OTHER PUBLICATIONS

International Search Report of PCT/US2020/015286 dated Apr. 23, 2020.

*Primary Examiner* — James J Debrow
(74) *Attorney, Agent, or Firm* — MATTINGLY & MALUR, PC

(57) ABSTRACT

A server system provides one or more element applications configured to render document elements, including generating visualization data representations for generating the document elements, in particular on the basis of data obtained from one or more data sources; executing a graphical user interface for access by a user on one or more client computers, each client computer or user thereof being associated with a respective tenant of one or more tenants, wherein the client computers are communicably connected with the server system via one or more communication networks; wherein one or more document applications are provided for generating electronic documents upon request of a respective client computer or user thereof for being displayed and/or for printing purposes, the one or more document applications being executed on the one or more client computers and/or on one or more servers of the server system.

14 Claims, 6 Drawing Sheets

(51) Int. Cl.
*G06F 9/54* (2006.01)
*G06F 16/93* (2019.01)

(56) References Cited

U.S. PATENT DOCUMENTS

| | | |
|---|---|---|
| 2014/0198055 A1 | 7/2014 | Barkway et al. |
| 2014/0281870 A1* | 9/2014 | Vogel et al. .......... G06F 17/246 |
| 2015/0020177 A1* | 1/2015 | Shmulevich ............ H04L 63/08 |
| 2018/0024701 A1 | 1/2018 | Sanches et al. |
| 2018/0232352 A1 | 8/2018 | Fulford et al. |
| 2019/0220591 A1 | 7/2019 | Burriesci et al. |

\* cited by examiner

METHODS, APPARATUSES AND SYSTEMS FOR MANAGING A MULTI-TENANT APPLICATION SYSTEM

The present disclosure relates to methods, apparatuses and systems for managing a multi-tenant application system.

BACKGROUND

The work produced by organizations (e.g. including one or more users using one or more computers) may be commonly based on and/or structured around computer-implemented, computer-based and/or computer-supported processes, e.g. including computer-implemented, computer-based and/or computer-supported business processes.

To support the execution of such processes such as e.g. business processes, or as their product(s), multiple documents such as e.g. business documents may typically be produced, including (but not limited to) electronic documents, e.g. for being displayed to the user and/or for printing. Documents such as electronic can be of varied types, such as e.g. text documents, presentation documents, image documents, spreadsheets, forms, reports, dashboards, data analysis documents, etc.

Virtual tools which may be used to produce documents such as electronic documents may include software applications. Notable examples of such software applications which may be used to produce business documents are, e.g., report designers and renderers, dashboard designers and viewers, ad hoc data explorers, as well as office-like applications for creating electronic documents such as e.g. text documents, spreadsheets and presentations, etc.

Generally, to execute a process such as business process, an organization (including e.g. one or more users using one or more computers) may use one or more document applications, to produce one or more electronic documents, e.g. of varied types, each electronic document being made up of one or more document elements, e.g. of varied types.

In view of the above, it is an object of the present disclosure to provide systems, methods and apparatuses for efficiently and reliably making a variety of document elements available to a variety of document applications of a system, while further preferably offering a common experience, style and business logic, preferably for specific tenants in multi-tenant application system, and other environmental factors.

SUMMARY

In view of the above, there is proposed a system according to claim 1, in particular for managing a multi-tenant application system. Further exemplarily, there are proposed a method according to claim 13 and a computer program product according to claim 14. Dependent claims relate to some preferred exemplary embodiments.

Exemplary aspects may be provided as follows: According to some exemplary embodiments, there may be provided a system, in particular for managing a multi-tenant application system, the system including a server system providing one or more element applications which may be configured to generate document elements, optionally including rendering visualization data representations for generating the document elements, in particular on the basis of data obtained from one or more data sources or other data; and/or one or more client computers, each client computer or user thereof being associated with a respective tenant of one or more tenants, each client computer being preferably configured to execute a graphical user interface for access by the user, wherein the client computers are optionally communicably connected or connectable with the server system via one or more communication networks.

Exemplarily, one or more document applications may be provided for generating electronic documents such as, for example, upon request of a respective client computer or user thereof, in particular for being displayed and/or for printing purposes. The one or more document applications may be executed on the one or more client computers and/or on one or more servers of the server system.

Exemplarily, each electronic document may include and/or embed one or more document elements being preferably generated by the one or more element applications, for example, on the basis of the respective tenant being associated with the respective client computer or user requesting the document to be generated.

Exemplarily, the respective tenant associated with the respective client computer or user thereof may be determined based on a user authentication process at initiation of a respective current user session.

Exemplarily, each element application may be configured to interact with and/or implement a set of one or more application programming interfaces being preferably configured to enable communications between the one or more element applications and the one or more document applications.

Exemplarily, the set of one or more application programming interfaces may provide a rule-based configuration system utilized by the one or more element applications for generating document elements and/or rendering visualization data representations.

Exemplarily, the one or more element applications may be configured to execute generating document elements and/or rendering of visualization data representations for a respective document application accessed by a graphical user interface on a respective client computer based on configuration data.

Exemplarily, the configuration data may be indicative of at least one of the respective document application and the respective tenant associated with the respective client computer. Additionally or alternatively, exemplarily, the configuration data may indicative of a respective user of the respective client computer and/or a respective user of the respective document application.

Exemplarily, the one or more element applications may be configured to execute generating document elements and/or rendering of visualization data representations for the respective document application accessed through the respective graphical user interface on the respective client computer based on one or more configuration rules which may be provided by the rule-based configuration system utilized by the one or more element applications for generating document elements and/or rendering visualization data representations.

Exemplarily, the one or more element applications may be configured to execute generating document elements and/or rendering of visualization data representations based on one or more configuration rules which may preferably be associated with the respective document application and/or with the respective tenant, the rules being preferably indicated in the associated configuration data.

Exemplarily, the one or more element applications may be configured to execute generating document elements and/or rendering of visualization data representations based on one or more configuration rules which may be associated with the respective user of the respective client computer and/or the respective document application, the rules being preferably indicated in associated configuration data.

Exemplarily, the configuration data may be further indicative of parameters relating to a theme and/or a locale. Preferably, the one or more element applications may be configured to execute generating document elements and/or rendering of visualization data representations for the respective document application based on one or more configuration rules associated with the parameters relating to a theme and/or a locale being indicated in the configuration data.

Exemplarily, the one or more element applications may be configured to execute generating document elements and/or rendering of visualization data representations for a respective document application further based on metadata which may preferably be provided by one or more application programming interfaces.

Exemplarily, the server system may include one or more servers configured to execute the one or more element applications and to provide generated document elements and/or rendered visualization data representations to one or more document applications executing on the one or more client computers via the one or more communication networks.

Exemplarily, additionally or alternatively, the server system may include one or more webservers configured to provide the one or more document applications as web-based applications to the one or more client computers via the one or more communication networks.

In further exemplary aspects, which may be combined with any one or more of the above aspects, there may be provided a method, including: providing, by a server system, one or more element applications configured to generate document elements, including rendering visualization data representations for generating the document elements, in particular on the basis of data obtained from one or more data sources; and/or executing a graphical user interface for access by a user on one or more client computers, each client computer or user thereof being associated with a respective tenant of one or more tenants, wherein the client computers are communicably connected with the server system via one or more communication networks.

Herein, one or more document applications may be provided for generating electronic documents upon request of a respective client computer or user thereof for being displayed and/or for printing purposes, the one or more document applications being preferably executed on the one or more client computers and/or on one or more servers of the server system.

Further preferably, each electronic document may include and/or embed one or more document elements generated by the one or more element applications on the basis of the respective tenant being associated with the respective client computer or user requesting the document to be generated.

In further exemplary aspects, which may be combined with any one or more of the above aspects, there may be provided a computer program product comprising computer-readable instructions that, when executed in a computer system (such as on one or more client computers and/or on one or more servers), cause the computer system to execute one or more steps of the above or below-described methods.

While certain exemplary aspects have been described above, it is to be understood that such aspects are merely illustrative of and are not restrictive on the broad invention, and that the exemplary aspects are not limited to the specific constructions and arrangements shown and described above, since various other changes, combinations, omissions, modifications and substitutions, in addition to those set forth in the above paragraphs, are possible.

Those skilled in the art will appreciate that various adaptations, modifications, and/or combination of the just described aspects can be configured. Therefore, it is to be understood that, further aspects may be practiced other than as specifically described herein. For example, unless expressly stated otherwise, the steps of processes described herein may be performed in orders different from those described herein and one or more steps may be combined, split, or performed simultaneously.

Those skilled in the art will also appreciate, in view of this disclosure, that different aspects described herein may be combined to form other aspects of the present disclosure.

DETAILED DESCRIPTION OF EXEMPLARY EMBODIMENTS

Figure 1:
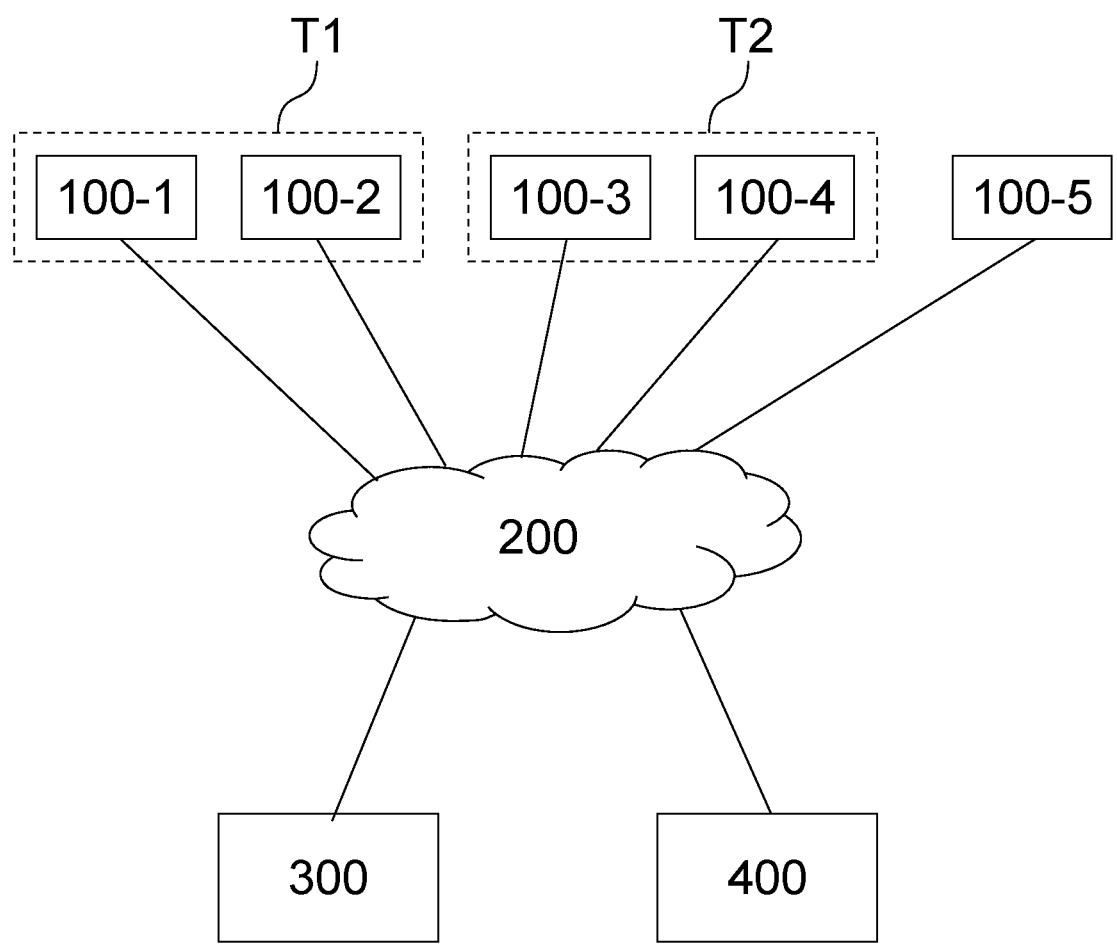
FIG. 1 illustrates a schematic view of a multi-tenant application system according to some exemplary embodiments.

In the following, preferred aspects and embodiments of the present invention will be described in more detail with reference to the accompanying figures. Same or similar features in different drawings and embodiments are referred to by similar reference numerals. It is to be understood that the detailed description below relating to various preferred aspects and preferred embodiments are not to be meant as limiting the scope of the present invention.

The work produced by organizations (e.g. including one or more users using one or more computers) may be commonly based on and/or structured around computer-implemented, computer-based and/or computer-supported processes, e.g. including computer-implemented, computer-based and/or computer-supported business processes.

To support the execution of such processes such as e.g. business processes, or as their product(s), multiple documents such as e.g. business documents may typically be produced, including (but not limited to) electronic documents, e.g. for being displayed to the user and/or for printing. Documents such as electronic can be of varied types, such as e.g. text documents, presentation documents, image documents, spreadsheets, forms, reports, dashboards, data analysis documents, etc.

The above may be provided within a client-server architecture, in some exemplary embodiments, for example in a system of FIG. 1 or similar.

FIG. 1 illustrates a schematic view of a multi-tenant application system according to some exemplary embodiments.

In the system according to FIG. 1, a plurality of client computers 100-1 to 100-5 are communicably connected (or connectable) via the network (or network system) 200 to a server system 300 (which may include one or more servers). The client computers may be realized as desktop computers, notebook computers, tablet computers, etc. Furthermore, a client computer may be realized by any device configured to run computer applications and connecting over a network by wired and/or wireless network connection. That is, client computers may be realized also as stationary workstations or as mobile devices such as e.g. smartphones or the like.

The network 200 can be realized by a global and/or public network, such as the internet, or the network 200 can be realized also as a wired or wireless private, local or regional network, such as a LAN, a WLAN or other.

Exemplarily, in FIG. 1, the client computers 100-1 and 100-2 are associated with a first tenant T1 and the client computers 100-3 and 100-4 are associated with another second tenant T2. In this context, a tenant is an organization including one or more users associated with the tenant. Exemplarily, a tenant can be a corporation and its employees or a department thereof, a, agency and its agents or a department thereof, or any other group of one or more users seeking to use a common application system.

For example, it may be that the client computers 100-1 and 100-2 are stationary desktop computers located at premises associated with the first tenant T1 and the client computers 100-3 and 100-4 are stationary desktop computers located at premises associated with the other second tenant T2. Then, it may be assumed that any user who logs in into any of the client computers 100-1 and 100-2 is associated with tenant T1 and it may be assumed that any user who logs in into any of the client computers 100-3 and 100-4 is associated with tenant T2.

However, in some other exemplary embodiments, users may be associated with multiple tenants or a publically accessible computer may be used by clients associated with different tenants. For example, the tenant may be determined when the user logs in to the computer.

This is exemplarily indicated by the client computer 100-5 in FIG. 1 not being associated with any tenant. However, a user may log in at client computer 100-5 and connect to the server 300 which acts on determination of the associated tenant, e.g. according to the process of user authentication. That is, server 300 can serve the client computer 100-5 according to the tenant configuration for tenant T1 or T2 based on determination of the associated tenant, e.g. according to the process of user authentication.

In some exemplary embodiments, server 300 may provide web applications accessed by browser applications on client computers and/or server 300 may provide applications accessed via application programming applications by local applications on the client computers other than a browser application.

In some exemplary embodiments, the server 300 may be a single server or a system of multiple servers interacting with each other or serving different services individually.

Exemplarily, client computers 100-1 to 100-5 and/or server 300 may further communicably connect to a database system 400 to obtain data such as external data, analysis data, data sources, etc. For example, software applications running on client computers 100-1 to 100-5 and/or the server 300 may obtain data from the database system 400, e.g. for the purpose of document creation.

Virtual tools which may be used to produce documents such as electronic documents, e.g. for being displayed and/or for printing, may include software applications. Notable examples of such software applications which may be used to produce documents, e.g. business documents, are, e.g., report designers and renderers, dashboard designers and viewers, ad hoc data explorers, as well as office-like applications for creating electronic documents such as e.g. text documents, spreadsheets and presentations, etc. This may include word processors, text editors or other text applications, spreadsheet applications, presentation applications, viewer applications, email editors, notes applications, browsers, database applications, or even content management system applications or desktop publishing applications.

Generically, making a variety of document elements available to a variety of document applications of a system, while offering a common experience, style and business logic, for specific tenants and other environmental factors, is the complex object which is addressed by this present disclosure and exemplary embodiments.

When document applications are part of an application suite, application platform and/or application system, the document applications can be configured to share the implementations, or services, of document element types. By itself, sharing of element types may be used to ensure a common baseline for the experience, style and business logic, across some or all applications of an application suite.

Nowadays, application suites have evolved from a set of related desktop applications, to a set of related web applications, deployed on the organizations' premises, to the newer software as a service (SaaS) web applications, which are typically hosted in the cloud and may be made available to any number of organizations, e.g. as tenants in a multi-tenant application system.

That is, modern application suites effectively may become multi-tenant application systems. Popular examples of SaaS application suites are the Office 365 and the Google Suite. Such SaaS application suites can be provided in a client-server architecture e.g. according to FIG. 1 in some exemplary embodiments.

In this present disclosure and in some exemplary embodiments, this type of application, which may produce documents such as electronic documents is referred to as a document application, and the product of the end user interaction with these document applications is referred to as a document.

In other words, a document application in the present context is an application which produces documents of a certain type for displaying and/or for printing.

Documents are typically structured. They may be composed of one or multiple elements, e.g. of varied types such as text, images, input fields, tables, diagrams, charts and maps, etc. In this present disclosure, these elements, e.g. of varied types, are referred to as document elements, or, if the context makes it clear, simply, elements.

Generally, document elements may include, show, indicate and/or expose some kind(s) of representation of data, referred to as data representations. For example, an image element may display a visual data representation of a matrix of pixels expressed in a certain format, like, for example, TIFF, JPEG, PNG, or other image formats. A text element may include text as another type of data representation. A table element may display a visual data representation of a set of data records, while a line chart, bar chart, pie chart or other chart can be another visual data representation of such data, e.g. favoring a certain perspective on which it can be interpreted.

Data representations do not need to be purely visual and can also stimulate other human senses. For example, through a sound file element, sound could be audibly reproduced, e.g. given data encoded in a WAV data format, read from a specified file.

Data representations can also be interactive and live. Take the example of data visualization, where, e.g. through a chart element, the represented data can be "sliced and diced" or the representation zoomed in and out by the end-user.

Additionally, because data itself can be dynamic, charts can be live and can e.g. be dynamically, repeatedly, periodically and/or continuously re-rendered, and/or also re-rendered in response to the arrival of new or changed data.

An exemplary characteristic of document element types can be that document elements of certain types tend to be useful for several types of documents. Document types usually differ in the way in which they compose, arrange, style and/or present document elements. For example, a table can be part of a text document and/or of a data analysis. An image can be part of a spreadsheet and/or of a presentation. That is, a document element can be included in multiple documents of the same and/or different document types.

In summary, to execute a process such as business process, an organization including e.g. one or more users using one or more computers) may use one or more document applications, to produce one or more electronic documents, e.g. of varied types, each electronic document being made up of one or more document elements, e.g. of varied types.

Frequently, the involved document applications are not integrated, are developed with different conventions, technologies, and at different times. This may represent an obstacle for an organization to offer a consistent experience and brand image, as well as to enforce business rules, in the graphical user interfaces of the document applications and in the produced documents. Such obstacles may even enhance if document applications are installed in an environment which is shared by multiple organizations, each with different needs.

In some exemplary embodiments, the rendering of document elements may be delegated to so-called element applications. Each type of document element may have a corresponding element application. That is, an element application may be configured to produce document elements of a certain type.

In some exemplary embodiments, element applications are able to render a single type of document element. Moreover, rendering, by an element application, is generating a representation of given data—a data representation—, as specified by a document element In some exemplary embodiments, there may be provided a dedicated application programming interface (API), referred to as Element API, configured to enable communication between one or more document applications and one or more element applications.

Communication between document applications and element applications can be provided through the abstract Element API, which all element applications implement.

This abstraction, provided by the Element API, allows to keep element applications independent of document applications, which is beneficial to achieving reusability. Additionally, document applications and element applications may become separated and/or isolated from each other in terms of implementation technologies, e.g. allowing each to choose the most appropriate technology for its function, which may remain hidden and can be transparently changed over time.

All applications of the system do preferably agree on the technology used for implementing the Element API. Its API contract may include the primitive technology on which the Graphical User Interface (GUI) of the document applications are built, and/or in which data representations rendered by element applications shall be expressed as well.

In a simple form, in some exemplary embodiments, a GUI can be built by rendering to a shared bitmap drawing canvas and/or on which certain regions may be owned by document elements. In some other exemplary embodiments, a GUI can be built using a mark-up language such as e.g. HTML, in which certain elements of an HTML document can be owned by corresponding document elements.

In the following, exemplary use cases of some exemplary embodiments are described. These example use cases may show aspects and benefits of exemplary embodiments, however such use cases shall not be regarded as limiting to the present disclosure.

Use Case 1: a Document Application May Embed One or More Data Representations Generated by One or More Element Applications Exemplarily, one or more element applications may respectively render one or more document elements, and the generated data representation(s) may be provided through the Element API to a document application which produces a document embedding the rendered document elements.

In such use case, exemplarily, a document produced using a Notes application (as an exemplary document application) may embed an image (image data; e.g. rendered by an image element application as an exemplary element application).

Also (e.g. alternatively), a document produced using a Text application (as an exemplary document application) may embed a bar chart (generic data; e.g. rendered by a bar chart element application as an exemplary element application).

Use Case 2: an Element Application is Useful for More than One Document Application Exemplarily, an element application may render one or more document elements, and the generated data representation(s) may be provided through the Element API to one or more document applications which respectively produce documents embedding one or more or all of the rendered document elements.

For example, a document may have been produced using a Text application (as an exemplary document application) and another document may have been produced using a Spreadsheet application (as another exemplary document application). Both of the produced documents may exemplarily embed an image produced by an image element application and/or a chart produced by a chart element application (different kinds of data; different element applications).

In general, e.g. combining the above use cases 1 and 2, multiple element applications may interact with multiple document applications. That is, exemplarily, plural element applications may render respective document elements, and the generated data representation(s) may be provided through the Element API to plural document applications which respectively produce documents embedding one or more or all of the rendered document elements.

Use Case 3: Generic Data Being Represented in Different Ways

Typically, an element application may render a document element of a certain type based on some provided data to represent the data in a certain way according to the document element type. When different element applications of different element types render respective document elements on the basis of the same data, the data is represented in different ways by document elements of different types. These document elements can be embedded by a document application into the same document.

That is, plural element applications may render respective document elements of different types based on the same underlying data, and the generated data representations may be provided through the Element API to a document application which produces a document embedding the rendered document elements.

For example, a document produced using a Spreadsheet application (as an exemplary document application) may embed a bar chart and a line chart, both exemplarily representing the same data but being produced by different element applications based on the same underlying data to be represented (same generic data; two or more element applications).

Use Case 4: an Element Application Rendering Differently According to the Value of the Tenant Context Variable An element application may use selected rendering settings which may be selected based on the tenant. That is, when rendering a document element, the element application may determine the tenant associated with the respective user and may then execute the rendering of the document element based on the determined tenant, so that the document elements will be rendered differently for different tenants, e.g. based on properties which are configurable differently for the different tenants. The tenant may be specified as a predefined context variable.

For example, for different tenants, the Bar chart (as an exemplary element application) may render data differently for the different tenants, e.g. using different color palettes (being an exemplary configured property).

Use Case 5: an Element Application Rendering Differently According to the Embedding Document Application An element application may use selected rendering settings which may be selected based on the (target) document application. That is, when rendering a document element, the element application may determine the document application which uses the element application and may then execute the rendering of the document element based on the determined document application, so that the document elements will be rendered differently for different document applications, e.g. based on properties which are configurable differently for the different document applications.

For example, a document produced using a Data Analyzer document application (as an exemplary document application) may embed a bar chart produced by a bar chart element application (as an exemplary element application), e.g. configured with certain properties, for example including a data set to represent.

Further exemplarily, a similar document may be produced by a separate Data Preparation document application (as an exemplary document application), also containing an embedded bar chart produced by the bar chart element application and given the same properties, including the data set to represent.

When the bar chart is rendered for the Data Analyzer document application, its size may exemplarily extend to fit all of the data categories, and displays a horizontal scroll-bar for navigation, thus favoring data exploration and analysis.

However, when the bar chart is rendered for the Data Preparation document application, its size may be fixed and the individual bars shrink so that all of the data categories fit in the available space, thus favoring quick analysis of the overall "shape of the data".

In this use case, it may be assumed that the bar chart element has a property such as "Sizing Mode", which allows choosing amongst the described sizing behaviors. The value of this property can be set through configuration, by defining two configuration rules whose pre-conditions apply to each of the document applications.

Use Case 6: the System being Configured without Requiring Explicit Compilation or a Restart A Systems Integrators or System Administrators may add a rule to a registered configuration rule set file. Taking effect immediately, without requiring the system to be restarted, any API operation executed afterwards may be subject to the new configuration rules. Preferably, it would be possible to edit configuration rules through an administration screen, accessible from within the system.

Summarizing the above use cases and combinations thereof, preferably a system is provided in some exemplary embodiments, in which one or more element applications may interact with one or more document applications via a dedicated application programming interface, e.g. the Element API. That is, exemplarily, one or more element applications may render respective document elements, and the generated data representations may be provided through the Element API to one or more document applications which respectively produce documents embedding one or more or all of the rendered document elements. One or more element applications may render respective document elements of different types based on different data and/or based on the same underlying data, and the generated data representations may be provided through the Element API to a document application which produces a document embedding the rendered document elements. In some examples, an element application may use selected rendering settings which may be selected based on the tenant. That is, when rendering a document element, the element application may determine the tenant associated with the respective user (e.g. based on user authentication) and may then execute the rendering of the document element based on the determined tenant, so that the document elements will be rendered differently for different tenants, e.g. based on properties which are configurable differently for the different tenants. In some examples, an element application may use selected rendering settings which may be selected based on the (caller) document application. That is, when rendering a document element, the element application may determine the document application which uses the element application and may then execute the rendering of the document element based on the determined document application, so that the document elements will be rendered differently for different document applications, e.g. based on properties which are configurable differently for the different document applications. In some examples, a Systems Integrators or System Administrators may add one or more rules to a registered configuration rule set file.

In the following, exemplary embodiments of arrangement of document applications and element application in potential server-client architectures, such as e.g. in the system of FIG. 1, are described.

Figure 2:
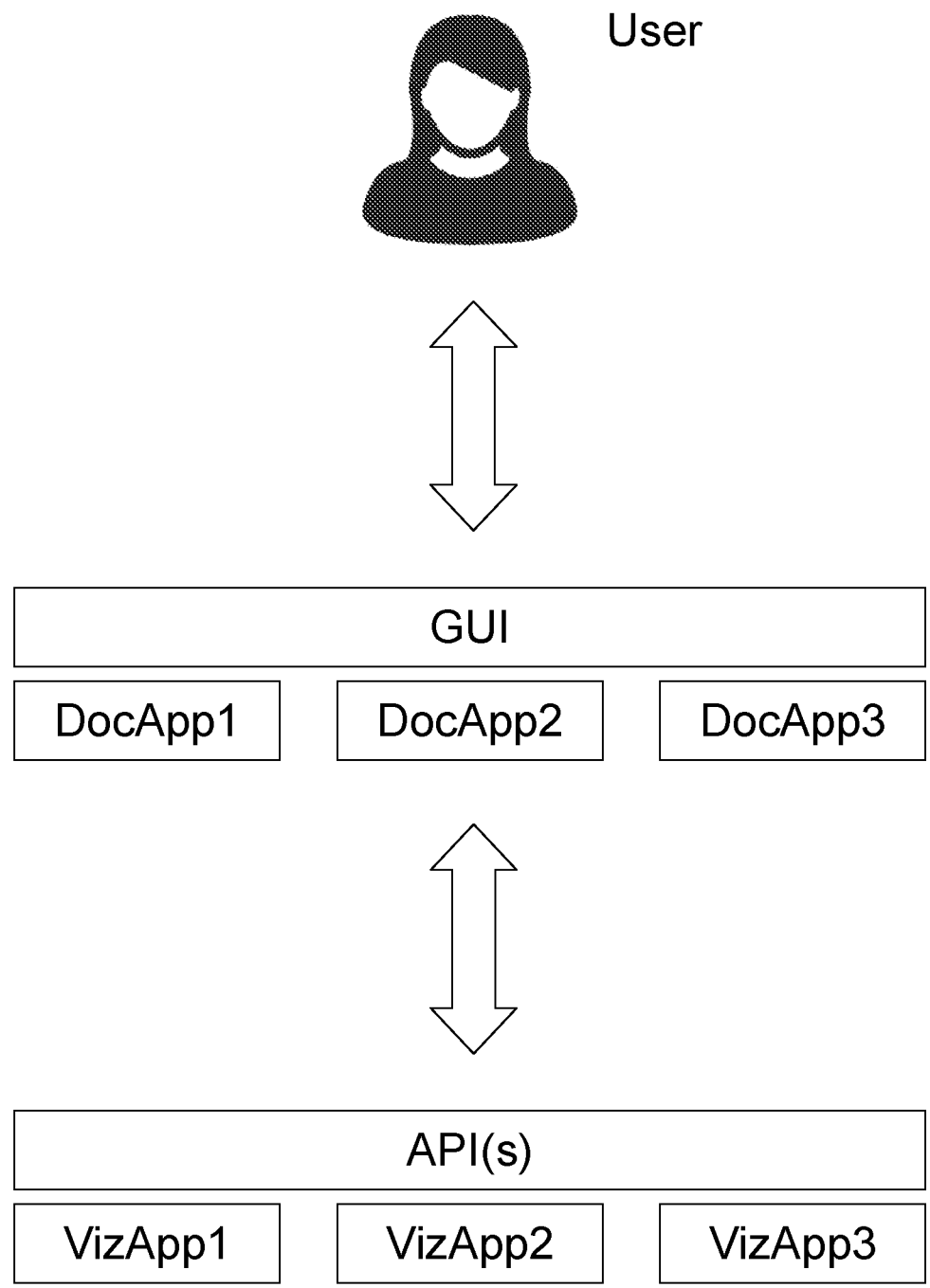
FIG. 2 illustrates a schematic view of an application system for producing documents according to some exemplary embodiments.

FIG. 2 illustrates a schematic view of an application system for producing documents according to some exemplary embodiments.

Exemplarily, the user may access the one or more of multiple document applications (e.g. any of document applications DocApp1, DocApp2 and/or DocApp3) via a graphical user interface GUI, e.g. the GUI being implemented on the client computer, e.g. for the purpose of document generation for displaying and/or for printing.

For communication between the document applications DocApp1, DocApp2 and/or DocApp3 and the element applications VizApp1, VizApp2 and/or VizApp3, one or more application programming interfaces (API) may be provided, such as e.g. the above described Element API and optionally other APIs such as the Theming API and/or others.

Accordingly, a system is provided in some exemplary embodiments, in which one or more element applications VizApp1, VizApp2 and/or VizApp3 may interact with one or more document applications DocApp1, DocApp2 and/or DocApp3 via a dedicated application programming interface, e.g. the Element API.

That is, exemplarily, the element applications VizApp1, VizApp2 and/or VizApp3 may render respective document elements, and the generated data representations may be provided through the Element API to the document applications DocApp1, DocApp2 and/or DocApp3 which respectively produce documents embedding one or more or all of the rendered document elements, e.g. controlled by the user via the GUI.

The element applications VizApp1, VizApp2 and/or VizApp3 may render respective document elements of different types based on different data and/or based on the same underlying data, and the generated data representations may be provided through the Element API to the respective caller document applications DocApp1, DocApp2 and/or DocApp3 which then produce respective documents embedding the rendered document elements.

In some examples, an element application(s) VizApp1, VizApp2 and/or VizApp3 may use selected rendering settings which may be selected based on the tenant. That is, when rendering a document element, the element applications VizApp1, VizApp2 and/or VizApp3 may determine the tenant associated with the respective user (e.g. based on user authentication) and may then execute the rendering of the document element based on the determined tenant, so that the document elements will be rendered differently for different tenants, e.g. based on properties which are configurable differently for the different tenants.

In some examples, the element applications VizApp1, VizApp2 and/or VizApp3 may use selected rendering settings which may be selected based on the (caller) document application DocApp1, DocApp2 and/or DocApp3. That is, when rendering a document element, the element application(s) may determine the document application which uses the element application and may then execute the rendering of the document element based on the determined document application, so that the document elements will be rendered differently for different document applications, e.g. based on properties which are configurable differently for the different document applications. In some examples, a Systems Integrators or System Administrators may add one or more rules to a registered configuration rule set file.

Figure 3A:
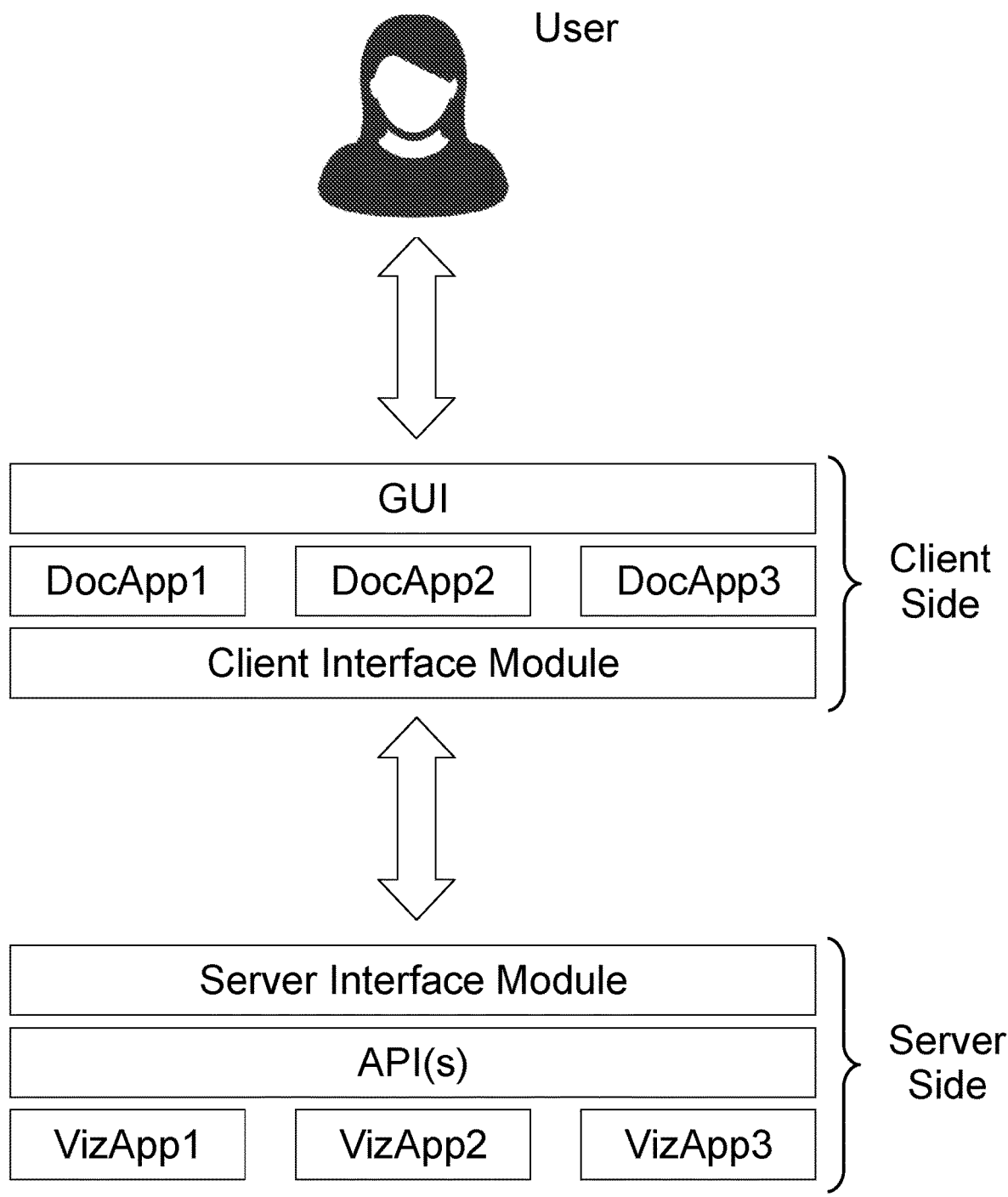
FIG. 3A illustrates a schematic view of a web service application system for producing documents in a client-server configuration according to some exemplary embodiments.

FIG. 3A illustrates a schematic view of a web service application system for producing documents in a client-server configuration according to some exemplary embodiments.

Exemplarily, in FIG. 3A, the GUI and the document applications DocApp1, DocApp2 and/or DocApp3 are executed locally on the client computer (e.g. on any one or more of the client computers 100-1 to 100-5 in FIG. 1) referred to as client side in the client server architecture.

Further exemplarily, in FIG. 3A, the element applications VizApp1, VizApp2 and/or VizApp3 are executed on the server(s) such as e.g. on server 300 in FIG. 3A, referred to as server side in the client server architecture.

For communication between the client side and the server side, there are provided client and server interface modules on the client and server sides, respectively.

Furthermore, exemplarily, the application programming interfaces are provided on the server side, e.g. being implemented in each of the element applications VizApp1, VizApp2 and/or VizApp3.

In such example, the documents are produced by the document applications on the client side accessed directly by the user, and document elements embedded in the documents are rendered by the respective element applications remotely on the server side and the respective data representations are provided to the client side from the server side.

Figure 3B:
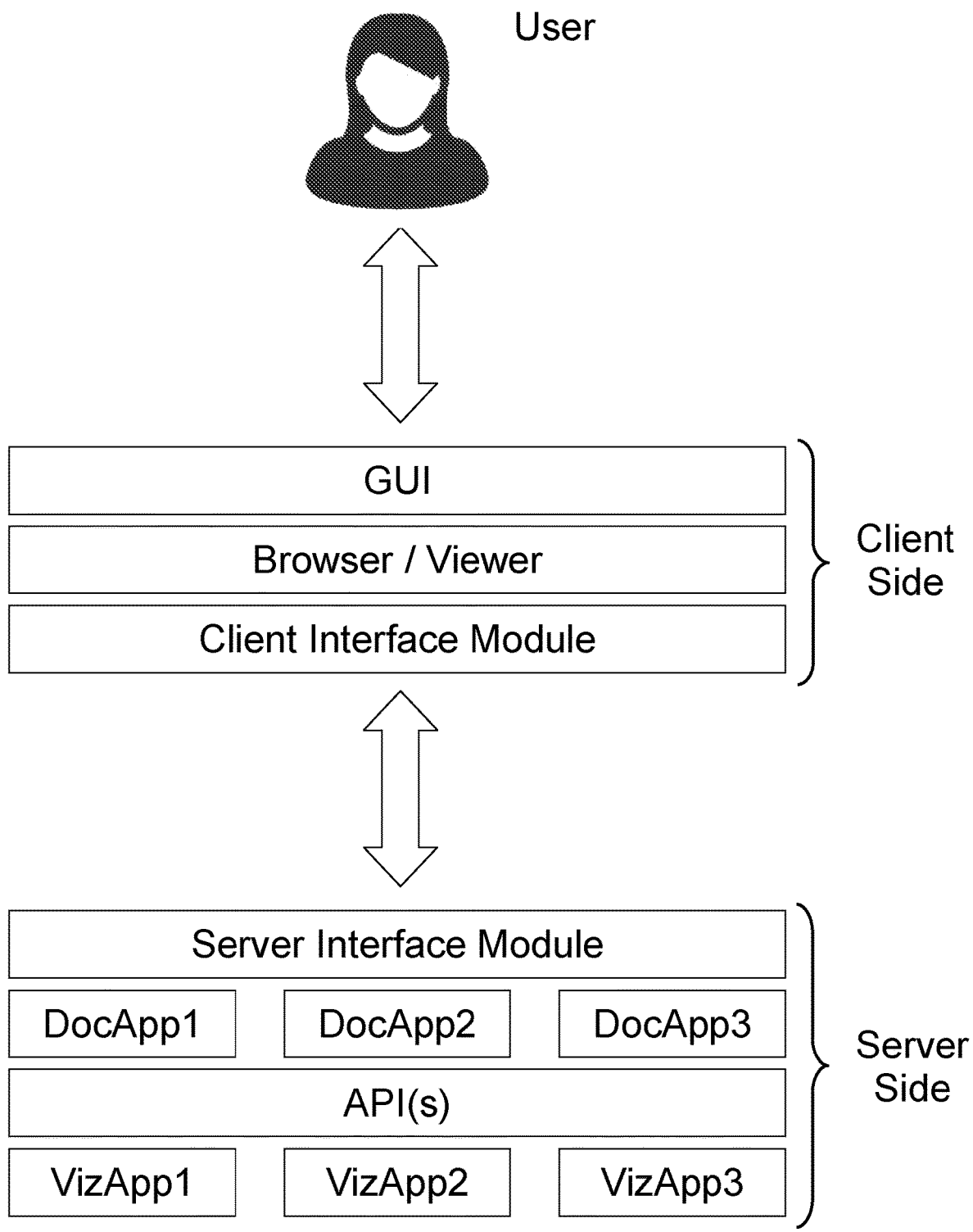
FIG. 3B illustrates a schematic view of a web service application system for producing documents in another client-server configuration according to some exemplary embodiments.

FIG. 3B illustrates a schematic view of a web service application system for producing documents in another client-server configuration according to some exemplary embodiments.

Exemplarily, in FIG. 3B, the GUI and a browser application (or viewer application) are executed locally on the client computer (e.g. on any one or more of the client computers 100-1 to 100-5 in FIG. 1) referred to as client side in the client server architecture.

On the other hand, in such exemplary embodiments, both of the document applications DocApp1, DocApp2 and/or DocApp3 and the element applications VizApp1, VizApp2 and/or VizApp3 are executed on the server(s) such as e.g. on server 300 in FIG. 3A.

For communication between the client side and the server side, there are provided client and server interface modules on the client and server sides, respectively. Furthermore, exemplarily, the application programming interfaces are provided on the server side, e.g. being implemented in each of the element applications VizApp1, VizApp2 and/or VizApp3.

In such example, the documents are produced remotely on the server side by the document applications on the server side accessed indirectly by the user through a web service, e.g. by the client side browser or another local viewer application, and document elements embedded in the documents are rendered by the respective element applications also remotely on the server side (e.g. on the same server or other servers of the server system) and the generated documents are then provided to the client side from the server side.

In the following, further exemplary details of some exemplary embodiments will be described.

While it is not a requirement, the isolation achieved by the Element API may mean, in some exemplary embodiments, that document applications will tend to not know specific element applications. How can then document applications collect usage options, i.e. properties, for an unknown element type from the end user? What are the properties that an element of a given type supports?

One solution, according to some exemplary embodiments, is for element types to provide their own property editors. Document applications may then open these property editors, e.g. to collect element properties, e.g. upon request from the end user. This solution does not give document applications much control on the experience of properties' collection, albeit this being a part of the experience that document applications tend to customize.

Another preferred solution, according to some exemplary embodiments, is for the element types to expose metadata about the available properties, thus allowing document applications to collect and/or validate properties themselves.

The later solution using metadata about available properties of element types may be regarded to be the preferred option, e.g. because of one or more of the following reasons:
  a. This allows document applications to provide a more integrated experience for the collection of element properties.
  b. Furthermore, a generic validator can be built that validates element properties according to the associated element type metadata.
  c. Also, document applications can use the element type metadata to automatically generate the graphical user interface (GUI) that may collect an element's properties and also use the validator to validate these.
  d. Further, element applications can validate the received properties by using the same validator.
  e. It may be easier to implement element types and corresponding element applications.
  f. Element type metadata can be configured by third parties, such as system integrators and administrators to meet the desired experience, style and business logic (more, below, on configuration).

This disclosure does not preclude a specific language for describing element type metadata. However, one such exemplary language is presented to better illustrate its role and importance.

A rich metadata language would include the ability to specify:
  a. visual style—e.g. default or forced value of a "Line style" property; label of an element type.
  b. business logic—e.g. applicability, validation and requiredness of properties.
  c. dynamic behavior—e.g. a property is applicable only if another property has a certain value.

As already discussed above, sharing of document element types, by itself, achieves a common baseline for experience, style and business logic, across document applications.

However, it may still be difficult to achieve being able to change the common baseline characteristics, to adjust the common baseline characteristics to meet the needs of specific tenants, document applications and other environmental factors, and to change characteristics without having to recompile the applications and restart the system (which may be a necessity of the volatility of business needs and of the desires to keep costs down and systems "up").

In view of the above, exemplary embodiments may introduce a rule-based configuration sub-system to achieve the desired flexibility. The configuration sub-system may be intended to be used by system integrators and administrators and can be used while the system is online in some exemplary embodiments. Configuration rules can target the element types' metadata in a selective manner, e.g. based on contextual information, such as that of the user session. Applications may obtain configurations through use of the Configuration API.

The combination of a rich element metadata model and a powerful configuration system, in the context of a multi-application and multi-tenant system in some exemplary embodiments, is another one of the novel aspects of the present disclosure.

In some of the preferred exemplary embodiments, the application programming interfaces may be based on web technologies, allowing to natively satisfy the most compelling SaaS web application suite scenario.

Applications may exemplarily be implemented in the JavaScript language and render to one or more DOM (Document Object Model) technologies (e.g. HTML, SVG, Canvas or WebGL).

For visual representation, i.e. data visualization, element applications can be implemented with popular graphics and charting libraries (e.g. D3, Protovis, ThreeJS, React and High Charts).

Data representations may use mixed DOM technologies for displaying auxiliary interactive elements, such as e.g. tooltips or legends.

Configuration rules may be provided as JSON-like specifications, e.g. containing simple values, but that can contain JavaScript functions as well, allowing for configurations that have dependencies to be built.

One of the proposed application programming interfaces, referred to as the Theming API, may be specifically targeted for web application scenarios, where visual styling may be achieved through direct use of CSS (Cascading Style Sheets).

The Theming API may be configured to define simple abstractions for mediating content creators and CSS style providers. In practice, the Theming API may allow system integrators to style the DOM content produced by data representations or, for example, the presentation of element types in the menu of document applications, e.g. using CSS.

Figure 4:
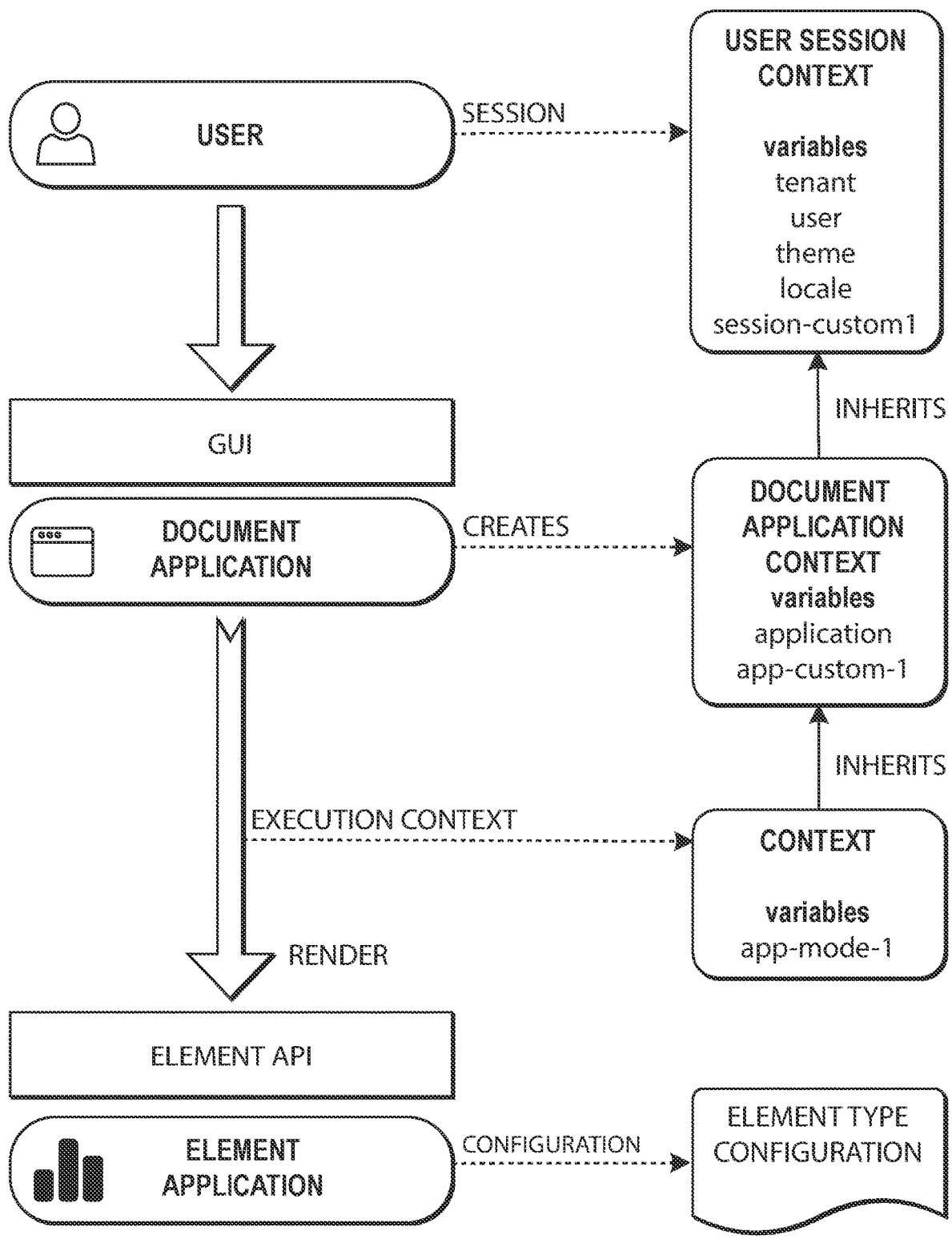
FIG. 4 illustrates a schematic application system overview of a multi-tenant application system for producing documents according to some exemplary embodiments.

FIG. 4 illustrates a schematic application system overview of a multi-tenant application system for producing documents according to some exemplary embodiments. Specifically, FIG. 4 illustrates, at an abstract high-level, the design of an exemplary system which has exemplary optional aspects as described in the following sections.

User Session and Tenancy
  a. A user is preferably to be authenticated to use the system.
  b. An authenticated user may have an associated user session.
  c. A user can "belong" to one or more tenants.
  d. User authentication can be performed against one of the tenants he "belongs" to.
  e. A user session may contain a set of session variables which constitute the user session context:
    a. user—the user name,
    b. tenant—the tenant,
    c. locale—(optional) the language locale used to internationalize content for this user,
    d. theme—(optional) the styling theme, that guides main presentation and representation choices.
  f. A Systems Integrator or System Administrator may define and setup additional session variables (how this is done is implementation defined).

Document Application
  a. A system may be composed of one or more document applications.
  b. Document applications are the main system components with which end users interact.
  c. End user access to each of the document applications available in the system may be controlled.
  d. Document applications produce a document, as the product of end user interaction.

This definition may stand irrespective of whether a document application supports:
  a. A single document to be created, per user or for all users, which is saved and re-loaded or is reset on every use of the application.
  b. Multiple documents to be created, saved and later loaded.

e. Document applications delegate rendering of each document element of a document to the element application corresponding to the element's type.
f. Document applications communicate with element applications exclusively through abstract APIs, such as the Element API.
g. A document application defines a document application context, which it preferably inherits from the current user session context.
   a. This requires a single variable, the application variable, which may identify the document application.
   b. A document application may define custom application context variables.
h. Operation executions initiated by the document application specify its document application context (or one inheriting from it) as the execution context.
i. A document application can package a configuration rule set. For example, to customize the characteristics of known element applications with the document application, optionally, depending on other context variables.

Document

A document may contain one or more document elements.

Document Element a. Document elements may belong to a single document.
b. Document elements have a type.
c. Document element types have metadata describing the possible properties of their document elements.
d. Document element types have a corresponding element application which renders their data representation. Element applications are able to render a single type of document element.
e. Document elements store information about the values of the possible properties, as specified by the end user, including the data or data source that feeds it.

Element Application a. A system is composed of one or more element applications.
b. End user access to each of the element applications available in the system may be controlled.
c. Generally, any element application may be used by any document application.
d. Element applications should not know any document application (unless, possibly, through selective configuration).
e. Element applications can package a configuration rule set. For example, to customize the characteristics of an element application with known document applications and, optionally, other contextual variables.
f. Element applications implement the Element API.

APIs, Operations and Execution a. APIs are either supported directly by the system, like the Configuration API and the optional Theming API, or are supported by an application, like the Element API.
b. APIs are composed of one or more operations.
c. API operations are executed on a target by a caller.
d. When executing an API operation, the caller may specify a Request and gets a Response from the target.
e. The Request of all API operations contains an execution context, which inherits, directly or indirectly, from the user session context. Target APIs may use the specified execution context to obtain contextualized configuration options, as is illustrated e.g. in FIG. 5.

Exemplary End User Experience

A single type of end user is exemplarily considered for this description, without loss of generality of the presented solution.

a. The end user can access the system by:
   1. accessing a document application directly, or
   2. accessing the special home application, which lists and provides access to all of the document applications available to the end user.
b. When accessing the system and the end user is not yet logged in, he is presented with a login screen.
   1. The tenant variable may be determined in several ways. It can be:
      i. specified in the login screen,
      ii. be a function of the end user's login name (e.g. user@my-corp.com), or
      iii. for the case of web applications, implied by the sub-domain of the entry point URL (e.g. my-corp.my-cloud.com).
   2. During the login process, other session variables may be chosen by the user (e.g. locale and theme).
   3. If the end user is successfully authenticated against the determined tenant, he continues to the initial access point.
c. The end user may be allowed by a document application to:
   1. choose the elements to embed in a document, possibly being offered a list of available element types; otherwise, the document application may readily provide one or more elements;
   2. specify the properties of elements, including the represented data or data source;
   3. interact with the data representations exposed by document elements.

Exemplary Systems Integrator and System Administrator Experience a. Installs, integrates and maintains the system.
b. May define custom user session variables.
c. Adds configuration rules to the system:
   1. to customize the characteristics of element applications for certain document applications and other known context variables.
   2. to provide themes for styling user and element applications via CSS, as per the Theming API.
d. Configuration rules may be edited by accessing rule set files directly or, optionally, by using a dedicated user interface.

Exemplary Application Programming Interfaces

Figure 5:
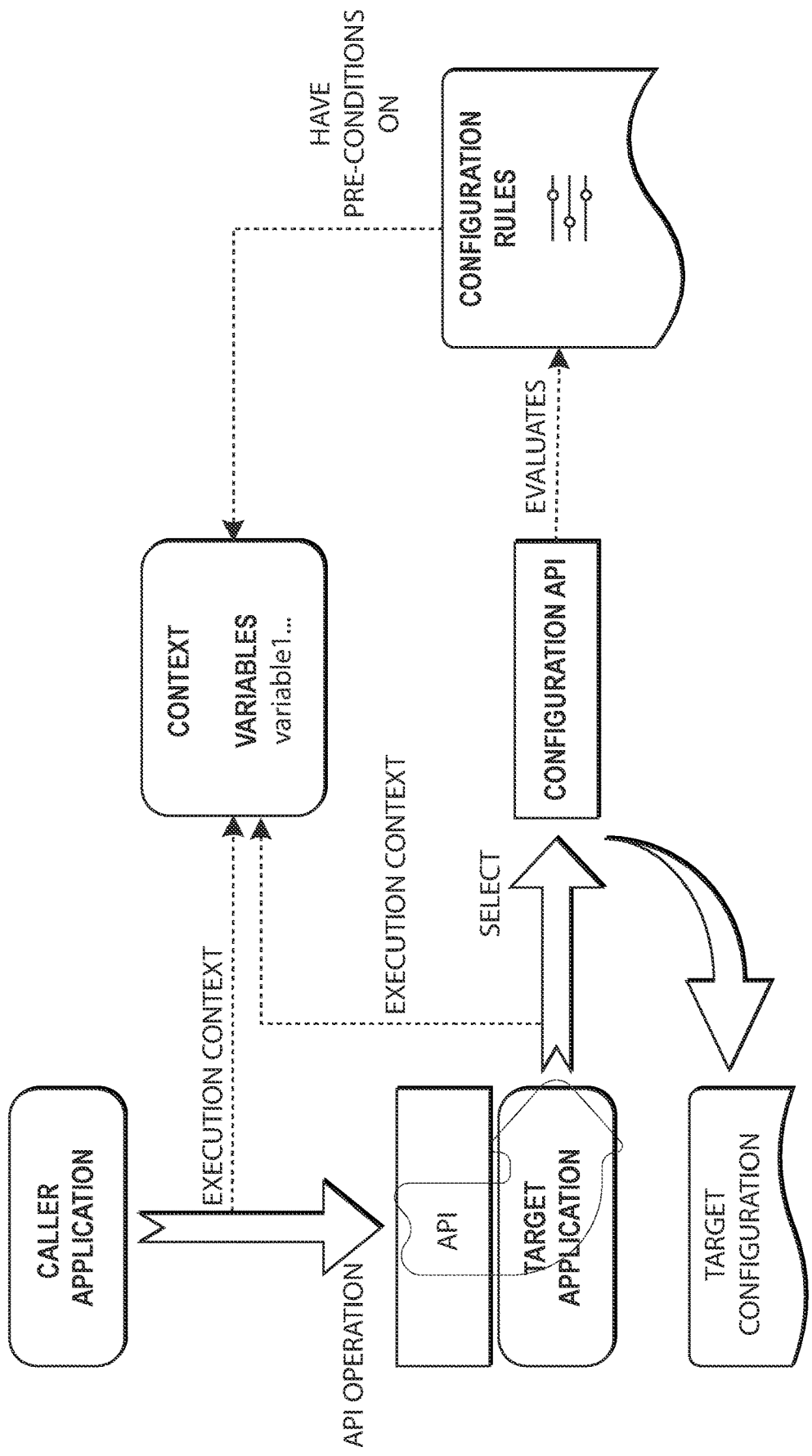
FIG. 5 illustrates a schematic view of a configurable API system according to some exemplary embodiments.

FIG. 5 illustrates a schematic view of a configurable API system according to some exemplary embodiments.

Configuration API

The Configuration API exposes the rule-based configuration sub-system. The configuration sub-system is provided with a list of configuration rule sets. It is implementation defined, how rule sets are registered with the configuration system. Table 1 below exemplarily lists some exemplary properties of a configuration rule set.

TABLE 1

Properties of configuration rule sets, IRuleSet.

| Name | Data type | Description |
| --- | --- | --- |
| rules | IRule[ ] | An array of configuration rules. |

The exemplary properties of a configuration rule in some exemplary embodiments are exemplarily listed in Table 2 and Table 3 below.

TABLE 2

Properties of configuration rules, IRule.

| Name | Data type | Description |
|---|---|---|
| select | IRuleSelector | Required. An object which describes the rule's applicability. |
| priority | Number | An integer, the importance of a rule. Defaults to 0. |
| deps | String[ ] | An array of module identifiers, of the associated programming language environment, to load as dependencies of the configuration rule, when it is evaluated. The modules' values are passed as arguments to the configuration function, when one is passed in apply. |
| apply | Object \| Function | Required. The actual configuration value. When an object is specified, it directly contains configuration properties. When a function is specified, of the associated programming language environment, it is called to construct the configuration value. It is given, as arguments, the values of the modules specified in deps. What constitutes a valid configuration is defined by the target(s), when select.annotation is not specified. Otherwise, valid configurations are defined by the annotation. |

TABLE 3

Properties of configuration rule selectors, IRuleSelector.

| Name | Data type | Description |
|---|---|---|
| target | String \| String[ ] | Required. The configuration target(s). |
| annotation | String | The target annotation. When unspecified, the configuration applies directly to the target(s). |
| application | String \| String[ ] | The applicable application(s). |
| tenant | String \| String[ ] | The applicable tenant(s). |
| user | String \| String[ ] | The applicable user(s). |
| theme | String \| String[ ] | The applicable theme(s). |
| locale | String \| String[ ] | The applicable locales(s). |
| custom variable | String \| String[ ] | The applicable value(s) of the custom variable. |

Essentially, the rule property select.target exemplarily allows specifying the configuration target(s) and the rule property apply exemplarily allows specifying the rule configuration.

For example, using JSON-like syntax, the following rule would exemplarily configure the lineWidth property of a fictitious "Line Chart" element:

```
{
  select: {
    target: "my-line-chart"
  },
  apply: {
    lineWidth: 2
  }
}
```

To limit the rule to only be applied when the line chart is being used by the "Data Analyzer" application and the theme is "diamond":

```
{
  select: {
    target: "my-line-chart",
    application: "data-analyzer",
    theme: "diamond"
```

```
  },
  apply: {
    lineWidth: 2
  }
}
```

Target Annotations

Besides specifying one or more configuration targets, configuration rules may additionally target an annotation. Target annotations are an exemplary mechanism for allowing third parties to extend the configuration-space associated with a configuration target.

For example, the fictitious "Data Analyzer" application may define a configuration property which determines how drill-down interactions are handled for chart elements. Should the parent level field of a hierarchy be kept in the new data set or should it simply be replaced by the drilled-to child-level field? The configuration option can be associated with elements by using the "Data Analyzer Element Options" annotation.

For example, the tenant "My Corp" wishes that the parent level should not be kept when the "Data Analyzer" application is displaying a "Bar chart" element. A configuration rule for specifying this would exemplarily look like the following:

```
{
  select: {
    target: "my-bar-chart",
    annotation: "data-analyzer-element-options",
    application: "data-analyzer",
    tenant: "my-corp"
  },
  apply: {
    keepParentLevelOnDrillDown: false
  }
}
```

Operations

The exemplary Configuration API has a single operation, Select, which, given the execution context, a configuration target and, optionally, an annotation, may return the corresponding merged configuration (see e.g. Table 4 below).

TABLE 4

The Select operation of the Configuration API.

| Name | Data type | Description |
|---|---|---|
| Request | | |
| context | Context | Required. The execution context. |
| target | String \| String[ ] | Required. The configuration target. |
| annotation | String | The target annotation. |
| Response | | |
| configuration | Object | The merged configuration, if any; null, otherwise. |

The merged configuration is exemplarily built by first initializing it with an empty configuration. Then, each configuration rule is exemplarily considered, in turn and in order, from lowest to highest specificity. If a configuration rule is applicable to the execution context, its configuration is evaluated and the result is merged into the merged configuration. When there are no more configuration rules, the merged configuration is final.

A rule is exemplarily considered more specific than another if it satisfies one or more of the following criteria:
 a. has a greater priority; this is the attribute that most affects specificity, and can be used to easily surpass every other affecting factor,
 b. selects a user (and the other doesn't),
 c. selects a theme (and the other doesn't),
 d. selects a locale (and the other doesn't),
 e. selects an application (and the other doesn't),
 f. belongs to a rule set whose source file path is ordered after (the other), alphabetically, or
 g. is at a greater index within its rule set.

Element API

Element applications implement the Element API. It serves as the main device of communication between document applications and element applications, in that direction. The API has two operations: Render and GetMetadata, whose exemplary contracts are listed in Table 5 and Table 6 below, respectively.

Further exemplarily, the GUI technology used by the system must be agreed upon by all document and element applications. In the Render operation, this technology is referred to as GuiElement.

TABLE 5

The Render operation of the Element API.

| Name | Data type | Description |
|---|---|---|
| Request | | |
| context | Context | Required. The execution context. |
| properties | Object | Required. An object whose properties conform to the element type metadata returned by the GetMetadata operation. Includes the data to be represented. |
| Response | | |
| dataRepresentation | GuiElement | The data representation in the agreed upon GUI technology format. |

TABLE 6

The GetMetadata operation of the Element API.

| Name | Data type | Description |
|---|---|---|
| Request | | |
| context | Context | Required. The execution context. |
| Response | | |
| elementTypeMetadata | ElementType | The metadata of the corresponding element type, already configured for the given execution context. |

Also, further exemplarily, the metadata language used by the system is agreed upon by all document applications and element applications. However, for clear demonstration of the role and importance of the metadata language, one such exemplary language is presented in this document.

The GetMetadata operation exemplarily refers to this language as the type ElementType. It exemplarily describes the structure, presentation and business logic for all elements of the type and is described in Table 7 and Table 8 below.

TABLE 7

Metadata attributes of document element types, ElementType.

| Name | Data type | Description |
|---|---|---|
| validate | Function(Element):Error | A function of the associated programming language environment. Performs arbitrary validation. When invalid, an Error object should be returned; null, otherwise. |
| props | PropertyDefinition[ ] | An array of property definitions. |
| UI supporting attributes | | |
| label | String | The localized name or short description. |
| description | String | A longer localized description, to display, for example in a tooltip. |
| helpUrl | String | The URL of a help document. |
| category | String | The category code used when grouping with other element types in a UI. |
| ordinal | Number | The order within its category. |
| isBrowsable | Boolean | Indicates if the element type is presented in browsing scenarios, like, for example, a menu displayingavailable element types. |
| isAdvanced | Boolean | Indicates that the element type is considered advanced. |

TABLE 8

Metadata attributes of element type properties, PropertyDefinition.

| Name | Data type | Description |
|---|---|---|
| name | String | Required. The name of the property. |
| valueType | "string" | "number" | "boolean" | "[string]" | "[number]" | "[boolean]" | The type of the value stored by the property; the default value is "string"; value types surrounded by brackets accept more than one value; cannot be configured. |
| defaultValue | String | Number | Boolean | String]] | Number]] | Boolean]] | Function | The default value of the property or a function that creates one each time. |
| value | String | Number | Boolean | String]] | Number]] | Boolean]] | Function | The forced value of the property or a function that creates one each time. |
| values | (String | Number | Boolean)]] | A list of possible values; configuration intersects with the definition values. |
| isApplicable | Boolean | Function(Element):Boolean | Determines if the property is applicable, i.e. if it currently makes sense; configuration value is combined with the definition value by conjunction. |
| isRequired | Boolean | Function(Element):Boolean | Determines if the property is required; configuration value is combined with the definition value by disjunction. |
| countMin | Number | Function(Element):Number | Determines the minimum number of values; configuration value is combined with the definition value by taking the maximum. |
| countMax | Number | Function(Element):Number | Determines the maximum number of values; configuration value is combined with the definition value by taking the minimum. |
| isEnabled | Boolean | Function(Element):Boolean | Determines if the property is enabled; configuration value is combined with the definition value by conjunction. |
| isVisible | Boolean | Function(Element):Boolean | Determines if the property is visible; configuration value is combined with the definition value by conjunction. |
| validate | Function(Element):Error | A function that allows performing arbitrary validation; when invalid, an Error object must be returned; null, otherwise. |

UI supporting attributes - the same supported by the element type metadata.

Some of the metadata attributes exemplarily allow for dynamic logic to be specified, by allowing that a function that receives an element to compute the attribute value. For example, this allows writing logic such as "Property 'Color Palette' is applicable if property 'Use Color' has the value true".

If JavaScript were used as a programming language, the isApplicable attribute of the "Color Palette" property could look like:

```
function(element) {
    return element.useColor;
}
```

In the context of the "Bar chart" element type metadata, in JSON-like format, it could then look like this:

```
{
  label: "Bar chart",
  props: [
    {
      name: "useColor",
      label: "Use color",
      valueType: "boolean",
      isRequired: true,
      defaultValue: true
    },
    {
      name: "colorPalette",
      label: "Palette",
      valueType: "[string]",
```

-continued

```
      isApplicable: function(element) {
        return element.useColor;
      },
      isRequired: true,
      defaultValue: ["red", "green", "blue"]
    }
  ]
}
```

A configuration rule could be written to change the default value of the useColor property, for the "Bar chart" element type and for the tenant "My Corp.". In JSON-like format, it would look like this:

```
{
  select: {
    target: "my-bar-chart",
    tenant: "my-corp"
  },
  apply: {
    props: [
      {
        name: "useColor",
        defaultValue: false
      }
    ]
  }
}
```

Element types can also be targeted by configuration annotations, as exemplarily listed in Table 9.

TABLE 9

Typical metadata annotations associated with element types.

| Annotation Type | Description |
| --- | --- |
| ThemeAnnotation | Associates theme resources for application UI integration. Typically provided by system integrators. |
| Document Application Options Annotations | General document-application-specific, per-element-type options, as in the previous "Drill-down" example. |

Theming API

The optional Theming API is preferably specific to web application embodiments. It exemplarily coordinates the interaction between content creators and theme providers on the definition and application of CSS styles to the DOM elements that these provide.

Content Creators

When, for example, a document application displays a menu entry representing an available element type, it may own the corresponding DOM element(s), and defines and documents what DOM elements and styles may be configured by other parties.

Likewise, when an element application renders data to DOM elements, it may own the DOM elements that it creates, and defines and documents which elements and styles can be configured by other parties.

In this description, both the document application(s) and the element application(s) may be regarded as being content creators, each creating distinct elements that compose the graphical user interface (GUI) of the document application. The elements that can be configured constitute what is called the themeable content.

Theme Providers

A theme may be considered a set of CSS styles and associated resources, like images and fonts, targeting themeable content.

The power of themes can be realized if the providers of themes are distinct from content creators.

For such, the Theming API leverages the exemplary rule-based configuration system to enable third-parties—the theme providers—to provide themes.

The ThemeAnnotation configuration annotation allows a theme provider to associate theme resources with a themeable module. Multiple theme annotations can be configured for an element application, with different styles, via multiple configuration rules, each selecting different values of the theme contextual variable.

For example, the following configuration rule would configure the style of the "Line Chart" element, when being used by the "Data Analyzer" application and the current theme is "diamond":

```
{
    select: {
        target: "my-line-chart",
        annotation: "ThemeAnnotation",
        application: "data-analyzer",
        theme: "diamond"
    },
    apply: {
        main: "/my/themes/diamond/style.css"
    }
}
```

EXAMPLES

Some embodiments can be used in an open platform for data intelligence—e.g. for the process of turning data into information. It may be made up of several components, which may serve different types of users and cover varied facets and stages of a data intelligence process, from data preparation and onboarding, to data integration, to data modeling, machine learning and analytics, and, lastly, to reporting, dashboarding and data visualization.

Specifically, data visualization, may be a key, cross-cutting functionality which surfaces in several potential products, such as e.g. a) in reporting applications, b) in dashboarding applications, and c) in data exploration applications.

Further, such applications may have been developed at different times, be implemented with diverse technologies and be of different forms, ranging from Java desktop and server applications to, more recently, client-side, JavaScript-centric, highly-interactive web applications. Each may have ended up offering different kinds of visualizations, equally of different underlying technologies, resulting in an inconsistent experience of data visualization across components.

Ultimately, a common abstraction for data visualization according to aspects and exemplary embodiments may be preferable, as the solution to provide a common experience and added value to, on one side, visualization, application and system integrator developers, and on another side, business users.

Aspects and exemplary embodiments have the potential to be reused across different products when there are further applications that need visualizations and other types of document elements (e.g. storage monitoring, analytics, data exploration, work flow execution). Most of such applications may possibly be deployed as SaaS where a common experience, visual style and business logic for specific tenants is preferred.

An exemplary use case may be provided in connection with an IoT application or IoT application suite, such as an application or application suite that may leverage the above-mentioned common abstraction for data visualization in order to provide charts for monitoring real-time streaming data. In this particular use case, using the Element API as an API specific for data visualization may create the abstraction layer between the application and the graphics library that will allow for future configurations of visual styles for specific tenants, but also the possibility of seamlessly changing the graphics library for specific environments.

Embodiments of the present invention may comprise or utilize a special purpose or general-purpose computer including computer hardware, such as, for example, one or more processors, system memory, and a touch screen display device, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, embodiments of the invention can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that computer storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the invention can also be implemented in cloud computing environments. In this description and the following claims, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud computing model can be composed of various characteristics such as, for example, on-demand self-service, broad network access, resource pooling, rapid elasticity, measured service, and so forth. A cloud computing model can also expose various service models, such as, for example, Software as a Service ("SaaS"), Platform as a Service ("PaaS"), and Infrastructure as a Service ("IaaS"). A cloud computing model can also be deployed using different deployment models such as private cloud, community cloud, public cloud, hybrid cloud, and so forth. In this description and in the claims, a "cloud computing environment" is an environment in which cloud computing is employed.

Embodiments of the invention provide mechanisms for simplifying software development and enhanced code reliability. A user interface, along with interactive and dynamic characteristics, can be described (programmatically and/or declaratively) independently of any specific device platform. User interface qualities can be described using a generic scene graph structure with attached behaviors. The generic scene graph can then be used to drive the user interface on any number of different computing platforms using platform specific (e.g., rendering, gesture recognition, etc.) sub-systems. Platform specific sub-systems can vary based on technologies that are used by the platform specific sub-systems. For example, rendering sub-systems can vary based on the technology used to render graphical data, such as, for example, OpenGL, XAML, DirectX, Cocoa/Quartz, etc.

Specifying both static and dynamic user interface structures in a common way (that can then be used on multiple different computing platforms) enables more efficient code delivery, more code re-use and higher quality experiences. Specifying user interface structures in a common way also minimizes having to develop large and/or complex quantities of code for different computing platforms. Specifying user interface structures in a common way also helps insure that user interface functionality is consistent and reliable on different computing platforms.

As will be appreciated by one of skill in the art, the present invention, as described hereinabove and the accompanying figures, may be embodied as a method (e.g., a computer-implemented process, a business process, or any other process), apparatus (including a device, machine, system, computer program product, and/or any other apparatus), or a combination of the foregoing.

Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system". Furthermore, embodiments of the present invention may take the form of a computer program product on a computer-readable medium having computer-executable program code embodied in the medium.

It should be noted that arrows may be used in drawings to represent communication, transfer, or other activity involving two or more entities. Double-ended arrows generally indicate that activity may occur in both directions (e.g., a command/request in one direction with a corresponding reply back in the other direction, or peer-to-peer communications initiated by either entity), although in some situations, activity may not necessarily occur in both directions.

Single-ended arrows generally indicate activity exclusively or predominantly in one direction, although it should be noted that, in certain situations, such directional activity actually may involve activities in both directions (e.g., a message from a sender to a receiver and an acknowledgement back from the receiver to the sender, or establishment of a connection prior to a transfer and termination of the connection following the transfer). Thus, the type of arrow used in a particular drawing to represent a particular activity is exemplary and should not be seen as limiting.

Embodiments of the present invention are described hereinabove with reference to flowchart illustrations and/or block diagrams of methods and apparatuses, and with reference to a number of sample views of a graphical user interface generated by the methods and/or apparatuses. It will be understood that each block of the flowchart illustrations and/or block diagrams, and/or combinations of blocks in the flowchart illustrations and/or block diagrams, as well as the graphical user interface, can be implemented by computer-executable program code.

The computer-executable program code may be provided to a processor of a general purpose computer, special purpose computer, or other programmable data processing apparatus to produce a particular machine, such that the program code, which executes via the processor of the computer or other programmable data processing apparatus, create means for implementing the functions/acts/outputs specified in the flowchart, block diagram block or blocks, figures, and/or written description.

These computer-executable program code may also be stored in a computer-readable memory that can direct a computer or other programmable data processing apparatus to function in a particular manner, such that the program code stored in the computer readable memory produce an article of manufacture including instruction means which implement the function/act/output specified in the flowchart, block diagram block(s), figures, and/or written description.

The computer-executable program code may also be loaded onto a computer or other programmable data processing apparatus to cause a series of operational steps to be performed on the computer or other programmable apparatus to produce a computer-implemented process such that the program code which executes on the computer or other programmable apparatus provides steps for implementing the functions/acts/outputs specified in the flowchart, block diagram block(s), figures, and/or written description. Alternatively, computer program implemented steps or acts may be combined with operator or human implemented steps or acts in order to carry out an embodiment of the invention.

It should be noted that terms such as "server" and "processor" may be used herein to describe devices that may be used in certain embodiments of the present invention and should not be construed to limit the present invention to any particular device type unless the context otherwise requires. Thus, a device may include, without limitation, a bridge, router, bridge-router (brouter), switch, node, server, computer, appliance, or other type of device. Such devices typically include one or more network interfaces for communicating over a communication network and a processor (e.g., a microprocessor with memory and other peripherals and/or application-specific hardware) configured accordingly to perform device functions.

Communication networks generally may include public and/or private networks; may include local-area, wide-area, metropolitan-area, storage, and/or other types of networks; and may employ communication technologies including, but in no way limited to, analog technologies, digital technologies, optical technologies, wireless technologies (e.g., Bluetooth), networking technologies, and internetworking technologies.

It should also be noted that devices may use communication protocols and messages (e.g., messages created, transmitted, received, stored, and/or processed by the device), and such messages may be conveyed by a communication network or medium.

Unless the context otherwise requires, the present invention should not be construed as being limited to any particular communication message type, communication message format, or communication protocol. Thus, a communication message generally may include, without limitation, a frame, packet, datagram, user datagram, cell, or other type of communication message.

Unless the context requires otherwise, references to specific communication protocols are exemplary, and it should be understood that alternative embodiments may, as appropriate, employ variations of such communication protocols (e.g., modifications or extensions of the protocol that may be made from time-to-time) or other protocols either known or developed in the future.

It should also be noted that logic flows may be described herein to demonstrate various aspects of the invention, and should not be construed to limit the present invention to any particular logic flow or logic implementation. The described logic may be partitioned into different logic blocks (e.g., programs, modules, functions, or subroutines) without changing the overall results or otherwise departing from the true scope of the invention.

Often times, logic elements may be added, modified, omitted, performed in a different order, or implemented using different logic constructs (e.g., logic gates, looping primitives, conditional logic, and other logic constructs) without changing the overall results or otherwise departing from the true scope of the invention.

The present invention may be embodied in many different forms, including, but in no way limited to, computer program logic for use with a processor (e.g., a microprocessor, microcontroller, digital signal processor, or general purpose computer), programmable logic for use with a programmable logic device (e.g., a Field Programmable Gate Array (FPGA) or other PLD), discrete components, integrated circuitry (e.g., an Application Specific Integrated Circuit (ASIC)), or any other means including any combination thereof. Computer program logic implementing some or all of the described functionality is typically implemented as a set of computer program instructions that is converted into a computer executable form, stored as such in a computer readable medium, and executed by a microprocessor under the control of an operating system. Hardware-based logic implementing some or all of the described functionality may be implemented using one or more appropriately configured FPGAs.

Computer program logic implementing all or part of the functionality previously described herein may be embodied in various forms, including, but in no way limited to, a source code form, a computer executable form, and various intermediate forms (e.g., forms generated by an assembler, compiler, linker, or locator).

Source code may include a series of computer program instructions implemented in any of various programming languages (e.g., an object code, an assembly language, or a high-level language such as Fortran, C, C++, JAVA, or HTML) for use with various operating systems or operating environments. The source code may define and use various data structures and communication messages. The source code may be in a computer executable form (e.g., via an interpreter), or the source code maybe converted (e.g., via a translator, assembler, or compiler) into a computer executable form.

Computer-executable program code for carrying out operations of embodiments of the present invention may be written in an object oriented, scripted or unscripted programming language such as Java, Perl, Smalltalk, C++, or the like. However, the computer program code for carrying out operations of embodiments of the present invention may also be written in conventional procedural programming languages, such as the "C" programming language or similar programming languages.

Computer program logic implementing all or part of the functionality previously described herein may be executed at different times on a single processor (e.g., concurrently) or may be executed at the same or different times on multiple processors and may run under a single operating system process/thread or under different operating system processes/threads.

Thus, the term "computer process" refers generally to the execution of a set of computer program instructions regardless of whether different computer processes are executed on the same or different processors and regardless of whether different computer processes run under the same operating system process/thread or different operating system processes/threads.

The computer program may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device.

The computer program may be fixed in any form in a signal that is transmittable to a computer using any of various communication technologies, including, but in no way limited to, analog technologies, digital technologies, optical technologies, wireless technologies (e.g., Bluetooth), networking technologies, and internetworking technologies.

The computer program may be distributed in any form as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL).

Any suitable computer readable medium may be utilized. The computer readable medium may be, for example but not limited to, an electronic, magnetic, optical, electromagnetic, infrared, or semiconductor system, apparatus, device, or medium.

More specific examples of the computer readable medium include, but are not limited to, an electrical connection having one or more wires or other tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

Programmable logic may be fixed either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), or other memory device.

The programmable logic may be fixed in a signal that is transmittable to a computer using any of various communication technologies, including, but in no way limited to, analog technologies, digital technologies, optical technologies, wireless technologies (e.g., Bluetooth), networking technologies, and internetworking technologies.

The programmable logic may be distributed as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web). Of course, some embodiments of the invention may be implemented as a combination of both software (e.g., a computer program product) and hardware. Still other embodiments of the invention are implemented as entirely hardware, or entirely software.

While certain exemplary embodiments have been described and shown in the accompanying drawings, it is to be understood that such embodiments are merely illustrative of and are not restrictive on the broad invention, and that the embodiments of invention are not limited to the specific constructions and arrangements shown and described, since various other changes, combinations, omissions, modifications and substitutions, in addition to those set forth in the above paragraphs, are possible.

Those skilled in the art will appreciate that various adaptations, modifications, and/or combination of the just described embodiments can be configured without departing from the scope and spirit of the invention. Therefore, it is to be understood that, within the scope of the appended claims, the invention may be practiced other than as specifically described herein. For example, unless expressly stated otherwise, the steps of processes described herein may be performed in orders different from those described herein and one or more steps may be combined, split, or performed simultaneously.

Those skilled in the art will also appreciate, in view of this disclosure, that different embodiments of the invention described herein may be combined to form other embodiments of the invention.

The invention claimed is:

1. A system including:
a server system providing one or more element applications configured to render document elements, including generating visualization data representations for rendering the document elements, in particular on the basis of data obtained from one or more data sources; and one or more client computers, each client computer or user thereof being associated with a respective tenant of one or more tenants, each client computer being configured to execute a graphical user interface (GUI) for access by the user, wherein the client computers are communicably connected with the server system via one or more communication networks;

wherein one or more document applications are provided for generating electronic documents upon request of a respective client computer or user thereof for at least one of being displayed and printing purposes, the one or more document applications being executed on at least one of the one or more client computers and the one or more servers of the server system, wherein each electronic document includes or embeds one or more document elements rendered by the one or more element applications on the basis of the respective tenant being associated with the respective client computer or user requesting the document to be generated, wherein the one or more element applications are configured to execute rendering document elements and generating of visualization data representations for the respective document application accessed through the respective GUI on the respective client computer based on one or more configuration rules provided by a rule-based configuration system utilized by the one or more element applications for rendering document elements and generating visualization data representations, and wherein the generated visualization data representations are displayed the respective GUI on the respective client computer.

2. The system of claim 1, wherein
the respective tenant associated with the respective client computer or user thereof is determined based on a user authentication process at initiation of a respective current user session.

3. The system of claim 1, wherein
each element application is configured to at least one of interact with and implement a set of one or more application programming interfaces configured to enable communications between the one or more element applications and the one or more document applications.

4. The system of claim 3, wherein
the set of one or more application programming interfaces provides a rule-based configuration system utilized by the one or more element applications for rendering document elements and generating visualization data representations.

5. The system of claim 1, wherein
the configuration data is indicative of at least one of the respective document application and the respective tenant associated with the respective client computer; or
the configuration data is indicative of a respective user of the respective client computer and/or a respective user of the respective document application.

6. The system of claim 1, wherein
the one or more element applications are configured to execute rendering document elements and generating of visualization data representations based on one or more configuration rules which are associated with at least one of the respective document application and the respective tenant, the rules being preferably indicated in associated configuration data.

7. The system of claim 1, wherein
the one or more element applications are configured to execute rendering document elements and generating of visualization data representations based on one or more configuration rules which are associated with at least one of the respective user of the respective client computer and the respective document application, the rules being preferably indicated in associated configuration data.

8. The system of claim 1, wherein
the configuration data is further indicative of parameters relating to at least one of a theme and a locale.

9. The system of claim 8, wherein
the one or more element applications are configured to execute rendering document elements and generating of visualization data representations for the respective document application based on one or more configuration rules associated with the parameters relating to at least one of a theme and a locale being indicated in the configuration data.

10. The system of claim 1, wherein
the one or more element applications are configured to execute rendering document elements and/or generating of visualization data representations for a respective document application further based on metadata provided by one or more application programming interfaces.

11. The system of claim 1, wherein
the server system includes one or more servers configured to execute the one or more element applications and to provide rendered document elements and generated visualization data representations to one or more document applications executing on the one or more client computers via the one or more communication networks; or
the server system includes one or more webservers configured to provide the one or more document applications as web-based applications to the one or more client computers via the one or more communication networks.

12. The system of claim 1, wherein the generated visualization data representations are interactive and/or live.

13. A method including:
providing, by a server system, one or more element applications configured to render document elements, including generating visualization data representations for rendering the document elements, in particular on the basis of data obtained from one or more data sources;
executing a graphical user interface (GUI) for access by a user on one or more client computers, each client computer or user thereof being associated with a respective tenant of one or more tenants, wherein the client computers are communicably connected with the server system via one or more communication networks;
wherein one or more document applications are provided for generating electronic documents upon request of a respective client computer or user thereof for at least one of being displayed and printing purposes, the one or more document applications being executed on at least one of the one or more client computers and the one or more servers of the server system,
wherein each electronic document includes or embeds one or more document elements rendered by the one or more element applications on the basis of the respective tenant being associated with the respective client computer or user requesting the document to be generated, wherein the one or more element applications are configured to execute rendering document elements and generating of visualization data representations for the respective document application accessed through the respective GUI on the respective client computer based on one or more configuration rules provided by a rule-based configuration system utilized by the one or more element applications for rendering document elements and generating visualization data representations, and wherein the generated visualization data representations are displayed the respective GUI on the respective client computer.

14. A non-transitory computer readable storage medium storing a computer program product comprising computer-readable instructions that, when executed in a computer system including one or more computers, cause the computer system to execute:

providing, by a server system, one or more element applications configured to render document elements, including generating visualization data representations for rendering the document elements, in particular on the basis of data obtained from one or more data sources;

executing a graphical user interface (GUI) for access by a user on one or more client computers, each client computer or user thereof being associated with a respective tenant of one or more tenants, wherein the client computers are communicably connected with the server system via one or more communication networks;

wherein one or more document applications are provided for generating electronic documents upon request of a respective client computer or user thereof for at least one of being displayed and printing purposes, the one or more document applications being executed on at least one of the one or more client computers and the on one or more servers of the server system, wherein each electronic document includes or embeds one or more document elements rendered by the one or more element applications on the basis of the respective tenant being associated with the respective client computer or user requesting the document to be generated, wherein the one or more element applications are configured to execute rendering document elements and generating of visualization data representations for the respective document application accessed through the respective GUI on the respective client computer based on one or more configuration rules provided by a rule-based configuration system utilized by the one or more element applications for rendering document elements and generating visualization data representations, and wherein the generated visualization data representations are displayed the respective GUI on the respective client computer.

* * * * *